May 26, 1925.
C. B. BIRD
1,539,346
CUTTING MECHANISM FOR CORN HARVESTERS
Filed Dec. 22, 1922
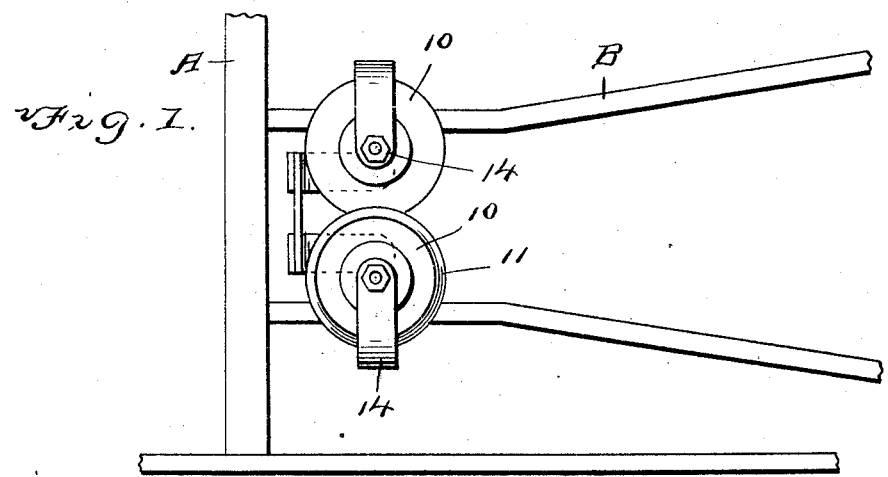
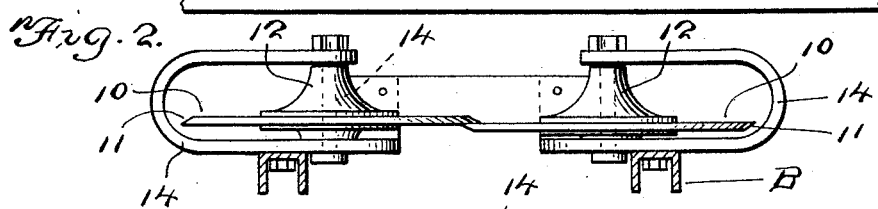
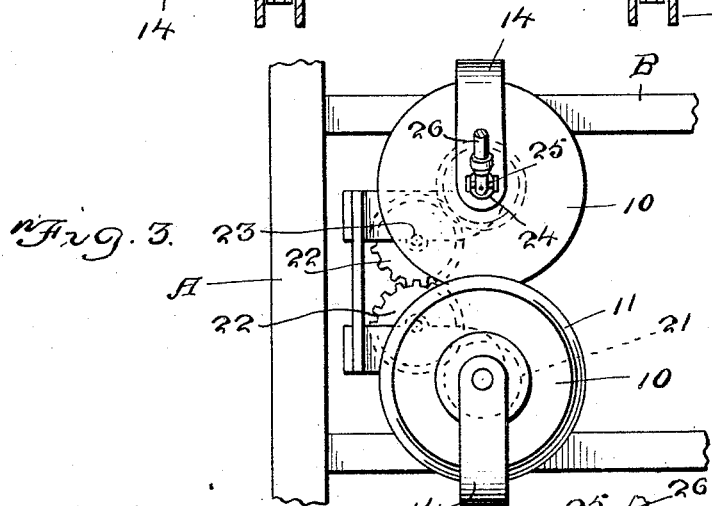
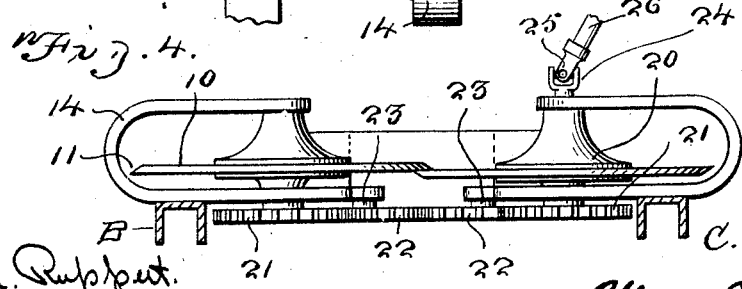

Patented May 26, 1925.

1,539,346

UNITED STATES PATENT OFFICE.

COURTLAND B. BIRD, OF WHEELER, WISCONSIN.

CUTTING MECHANISM FOR CORN HARVESTERS.

Application filed December 22, 1922. Serial No. 608,526.

*To all whom it may concern:*

Be it known that I, COURTLAND B. BIRD, a citizen of the United States, residing at Wheeler, in the county of Dunn and State of Wisconsin, have invented new and useful Improvements in Cutting Mechanism for Corn Harvesters, of which the following is a specification.

This invention relates to harvesting machinery and has for its object the provision of a novel cutting mechanism designed to replace the ordinary or well known cycle structure, the advantage being that the new construction will operate continuously and automatically upon engagement of the cutting elements with the stalks without it being necessary to provide a positive drive means, though a drive may be provided if found preferable.

An important and more specific object is the provision of a cutting mechanism of this character which may be installed in place of the ordinary structure and which will have the advantage of being simple and inexpensive to manufacture, not likely to get out of order, and which will do away with the high gear mechanism now necessary.

With the above and other objects and advantages in view the invention consists in the details of construction to be hereinafter more fully described and claimed and illustrated in the accompanying drawings, in which:

Figure 1 is a fragmentary plan view of a corn harvester showing my cutting mechanism thereon, Figure 2 is a cross sectional view through the frame showing my device in edge view, Figures 3 and 4 are views illustrating a modification.

Referring more particularly to the drawings the letter A designates a portion of a corn harvester and B represents the frame bars which are ordinarily provided to support the cutting mechanism and also the picker chains which carry the stalks rearwardly toward the binding mechanism. Ordinarily corn harvesters of this type are equipped with a sickle like cutting mechanism which frequently gets out of order and causes not only annoyance but considerable delay while repairs are being made. The cutting mechanism and picker chains are not illustrated as they form no part of the invention.

In carrying out my invention I replace the usual cutting structure with a mechanism which consists of a pair of circular disks 10 having beveled cutting edges 11 and held between arbors 12 which are rotatably mounted on pivot bolts 13 which pass through horizontally disposed U-shaped brackets 14 which are bolted on top of the frame bars B. These disks are so arranged that one is above the other with the flat sides of both contacting as clearly shown in Figure 2, the beveled side of the uppermost disk being to the top and the beveled side of the lower disk being at the bottom. This arrangement will insure a shearing action on any object passing between the disks.

When the cutting mechanism has been constructed and installed as above described and as shown in the drawings, it will be apparent that when the harvester is drawn along a corn field in the usual manner the engagement of the stalks against the meeting portions of the disks will cause the stalks to be jammed between the disks and consequently cut. The force applied to the disks by the standing stalks will cause the disks to rotate so that all portions of the cutting edges will receive equal wear.

In case it is desired to provide a positive drive for rotating the disks I make use of the structure shown in Figures 3 and 4. In this modification, I have shown the arbors of the disks as carrying gears 21 which mesh with gears 22 on shafts 23 projecting from the undersides of the inner ends of the brackets 14. The gears 22 intermesh as shown. In this instance one of the arbors 20 is equipped with an upstanding yoke 24 having connected therewith, by a universal joint 25, a short shaft 26 which may be driven from any desired movable element on the harvester mechanism.

When in the course of time the disks become dull it is a simple matter to remove them for the purpose of sharpening the cutting edges and in case of breakage it is apparent that a defective disk may be replaced by a new one, it being of course necessary that the arbors be unbolted.

From the foregoing description and a study of the drawings it will be apparent that I have thus provided a simply constructed and consequently inexpensive cutting mechanism which will be highly efficient and which will have the great advantage of not being likely to get out of order.

While I have shown and described the preferred embodiment of the invention it is of course to be understood that I reserve the right to make such changes in the form, construction and arrangement of parts as will not depart from the spirit of the invention or the scope of the subjoined claims.

I claim:

1. In a corn harvester including bars, a cutting mechanism comprising a pair of similar horizontally disposed U-shaped brackets mounted upon the bars and arranged with their open sides toward each other, pivot bolts traversing the U-shaped brackets, disks mounted upon said bolts and having cutting edges arranged in overlapping relation, gears on said bolts below the brackets, rearward extensions at the inner ends of said brackets formed with bearings, gears journaled at said bearings and meshing with each other and with first named gears, and means for driving one of the gears.

2. In a corn harvester including bars, a cutting mechanism comprising a pair of similar horizontally disposed U-shaped brackets mounted upon the bars and arranged with their open sides toward each other, pivot bolts traversing the U-shaped brackets, disks mounted upon said bolts and having cutting edges arranged in overlapping relation, gears on said bolts below the brackets, rearward extensions at the inner ends of said brackets formed with bearings, gears journaled at said bearings and meshing with each other and with said first named gears, means for driving one of the gears, the driving means consisting of a driven shaft having a universal joint connection with one of said pivot bolts.

In testimony whereof I affix my signature.

COURTLAND B. BIRD.